(12) United States Patent
Le et al.

(10) Patent No.: US 11,277,434 B2
(45) Date of Patent: Mar. 15, 2022

(54) REDUCING ATTACK SURFACE BY SELECTIVELY COLLOCATING APPLICATIONS ON HOST COMPUTERS

(71) Applicant: International Business Machines Corporation, Armonk, NY (US)

(72) Inventors: Michael Vu Le, Danbury, CT (US); Hani Talal Jamjoom, Cos Cob, CT (US); Ian Michael Molloy, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 130 days.

(21) Appl. No.: 16/827,798

(22) Filed: Mar. 24, 2020

(65) Prior Publication Data
US 2021/0306367 A1    Sep. 30, 2021

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC ............... H04L 63/1433; H04L 63/1441
See application file for complete search history.

(56) References Cited

U.S. PATENT DOCUMENTS

| | | | |
|---|---|---|---|
| 9,201,698 B2 | 12/2015 | Ashok et al. | |
| 2013/0232501 A1* | 9/2013 | Ashok ................. | G06F 9/5016 718/104 |
| 2015/0236975 A1* | 8/2015 | Saito .................... | G06F 9/5088 709/226 |
| 2015/0355946 A1 | 12/2015 | Kang | |
| 2016/0381133 A1* | 12/2016 | Palavalli ................ | H04L 67/10 709/226 |
| 2017/0039116 A1* | 2/2017 | Kelly ....................... | G06F 1/30 |
| 2018/0077196 A1 | 3/2018 | Itikarlapalli et al. | |
| 2018/0130171 A1* | 5/2018 | Prakash ............. | G06F 9/45533 |
| 2018/0329735 A1* | 11/2018 | Liu ..................... | G06F 9/45558 |
| 2019/0324814 A1* | 10/2019 | Wu ....................... | G06F 3/0607 |
| 2020/0034156 A1* | 1/2020 | Chuppala ................ | G06F 9/455 |

FOREIGN PATENT DOCUMENTS

WO    WO2016131830 A1    8/2016

OTHER PUBLICATIONS

Patent Cooperation Treaty (PCT) International Search Report, dated May 18, 2021, regarding Application No. PCT/EP2021/056780, 11 pages.

Mell et al., "The NIST Definition of Cloud Computing," Computer Security Division, National Institute of Standards and Technology, Jan. 2011, 7 pages.

(Continued)

*Primary Examiner* — Meng Li
(74) *Attorney, Agent, or Firm* — Yee & Associates, P, C,

(57) ABSTRACT

Reducing attack surface by selectively collocating applications on host computers is provided. System resources utilized by each application running in a plurality of host computers of a data processing environment are measured. Which applications running in the plurality of host computers that utilize similar system resources are determined. Those applications utilizing similar system resources are collocated on respective host computers.

22 Claims, 11 Drawing Sheets

(56) References Cited

OTHER PUBLICATIONS

Kuo et al., "MULTIK: A Framework for Orchestrating Multiple Specialized Kernels," arXiv:1903.06889v1, Cornell University, Mar. 16, 2019, 17 pages. https://arxiv.org/pdf/1903.06889.pdf.

Tartler et al., "Automatic OS Kernel TCB Reduction by Leveraging Compile-Time Configurability," HotDep'12, Proceedings of the Eighth USENIX conference on Hot Topics in System Dependability, Oct. 2012, 6 pages.

\* cited by examiner

REDUCING ATTACK SURFACE BY SELECTIVELY COLLOCATING APPLICATIONS ON HOST COMPUTERS

BACKGROUND

1. Field

The disclosure relates generally to network and systems security and more specifically to reducing an attack surface on host computers by selectively collocating a set of applications having a similar system resource utilization footprint on a same host computer and removing unused system resources from the host computers.

2. Description of the Related Art

Network security consists of the policies and practices adopted to prevent and monitor unauthorized access, misuse, modification, or denial of a computer network and network-accessible resources. Network security involves the authorization of access to the computer network and its resources. For example, once network users are authenticated, a firewall can enforce rules and policies that define what resources the network users are allowed to access.

However, an attacker (i.e., an unauthorized user) may utilize one or more system resources corresponding to a target host computer to bypass network security and carry out an attack. Such system resources may include, for example, code in an application or a shared resource, such as a library, or system stack, such as an operating system. In addition, the attacker may exploit reachable network assets, such as, for example, application programming interface endpoints and services, to perform a lateral movement attack. The attacker may also carry out a privilege escalation attack on a target host computer that contains privileged user accounts and/or applications. A privilege escalation attack is a type of network intrusion that takes advantage of programming errors or design flaws to grant the attacker elevated access to a network and its resources, such as privileged accounts and applications.

Currently, a number of solutions already exist that are targeted to network security. Typically, these solutions either protect against known attacks or identify malicious user behavior. Further, existing solutions may only focus on one host computer or one application at a time using, for example, isolation and restriction. Furthermore, existing control flow integrity solutions have high performance overhead and are not precise enough to prevent circumvention. Moreover, existing address space layout randomization solutions can also be circumvented due to base address leaking. In addition, vulnerability scanning of applications and libraries may miss certain vulnerabilities and cannot prevent return-oriented programming attacks. As a result, a need exists for increased network and systems security to decrease the potential of unauthorized user access and attack.

SUMMARY

According to one illustrative embodiment, a computer-implemented method for reducing attack surface by selectively collocating applications on host computers is provided. System resources utilized by each application running in a plurality of host computers of a data processing environment are measured. Which applications running in the plurality of host computers that utilize similar system resources are determined. Those applications utilizing similar system resources are collocated on respective host computers. According to other illustrative embodiments, a computer system and computer program product for reducing attack surface by selectively collocating applications on host computers are provided.

The illustrative embodiments also perform a boot strap operation on the plurality of host computers in the data processing environment, place applications on the plurality of host computers, profile the applications running on the plurality of host computers to obtain a system resource utilization footprint of each respective application, identify a plurality of different sets of applications having similar system resource utilization footprints based on the profiling of the applications, obtain a list of system resources corresponding to each respective host computer in the plurality of host computers, identify a set of used system resources in the list of system resources corresponding to each respective host computer being utilized by a running resident application, determine a set of unused system resources corresponding to each respective host computer by subtracting the set of used system resources from the list of system resources corresponding to each respective host computer, determine a greatest amount of attack surface reduction in each respective host computer based on placement of a particular set of applications having a similar system resource utilization footprint on a particular host computer and removal of a determined set of unused system resources corresponding to that particular host computer running that particular set of applications, assign each respective set of applications having the similar system resource utilization footprint to a specified host computer that has a greatest determined amount of attack surface reduction, and place each respective set of applications having the similar system resource utilization footprint on its assigned host computer in the data processing environment.

As a result, the illustrative embodiments increase overall security and trust of the data processing environment via application collocation that is based on application attack surface measurements, which reduces the likelihood of a successful attack. Further, the illustrative embodiments decrease susceptibility of the data processing environment from being accessed by a malicious actor. Thus, the illustrative embodiments provide technical solutions that overcome a technical problem with delivering environment-wide security. As a result, these one or more technical solutions provide a technical effect and practical application in the field of network and systems security.

DETAILED DESCRIPTION

Figure 1:
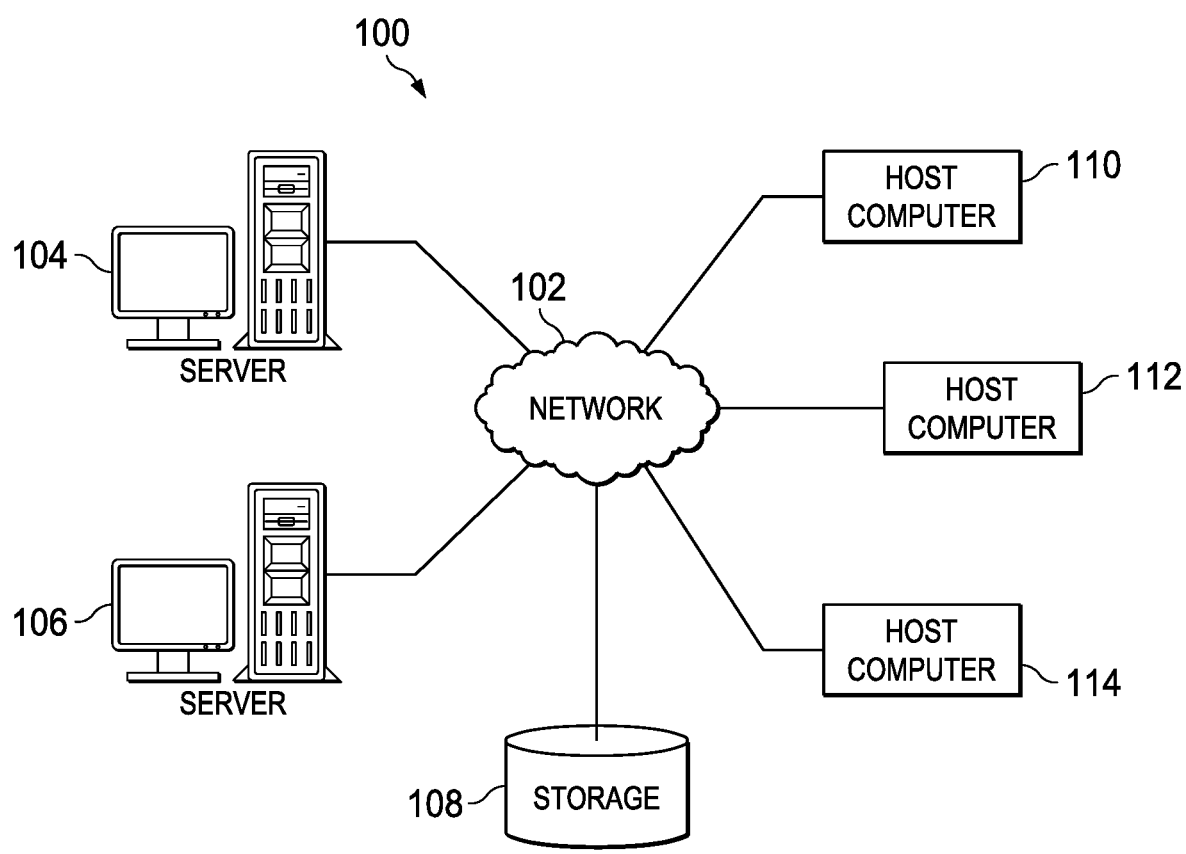
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a data processing environment in which illustrative embodiments may be implemented. Data processing environment 100 includes a network of computers and other devices in which the illustrative embodiments may be implemented. Data processing environment 100 may represent, for example, a cluster of computers in a data center or multiple computer nodes in a cloud environment.

Data processing environment 100 contains network 102, which is the medium used to provide communications links between the computers and other devices connected together within data processing environment 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. Also, it should be noted that server 104 and server 106 may each represent a set of one or more server computers.

In addition, server 104 and server 106 may provide attack surface reduction services to registered client host computers. For example, server 104 and server 106 may reduce attack surfaces on client host computers by selectively collocating a set of applications having a similar system resource utilization footprint on a same client host computer and removing unused system resources from those client host computers. Collocating includes removing applications from a first client host computer and installing applications on a second client host computer. System resources are a runtime environment consisting of shared host computer resources, such as, for example, processor, memory, storage, libraries, kernel system call identifiers, kernel subsystems, hypervisors, and the like, and shared network resources, such as, for example, network services, network traffic destinations (e.g., internet protocol addresses and port numbers), sensitive network user accounts with elevated access privileges, sensitive network applications with elevated access privileges, and the like.

Host computer 110, host computer 112, and host computer 114 also connect to network 102. Host computers 110, 112, and 114 are registered clients of server 104 and server 106. In this example, host computers 110, 112, and 114 are network computers that host a plurality of different applications. However, it should be noted that host computers 110, 112, and 114 may represent other types of data processing systems, such as, for example, desktop computers, laptop computers, handheld computers, smart phones, smart watches, smart televisions, smart appliances, gaming devices, kiosks, and the like, with wire or wireless communication links to network 102.

Storage 108 is a network storage device capable of storing any type of data in a structured format or an unstructured format. In addition, storage 108 may represent a plurality of network storage devices. Further, storage 108 may store identifiers and network addresses for a plurality of host computers, lists of system resources corresponding to each of the host computers, lists of applications loaded on the host computers, system resource utilization metrics corresponding to each of the applications loaded on the host computers, and the like. Furthermore, storage 108 may store other types of data, such as authentication or credential data that may include user names, passwords, and biometric data associated with system administrators and users, for example.

In addition, it should be noted that data processing environment 100 may include any number of additional server computers, host computers, storage devices, and other devices not shown. Program code located in data processing environment 100 may be stored on a computer readable storage medium and downloaded to a computer or other data processing device for use. For example, program code may be stored on a computer readable storage medium on server 104 and downloaded to host computer 110 over network 102 for use on host computer 110.

In the depicted example, data processing environment 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
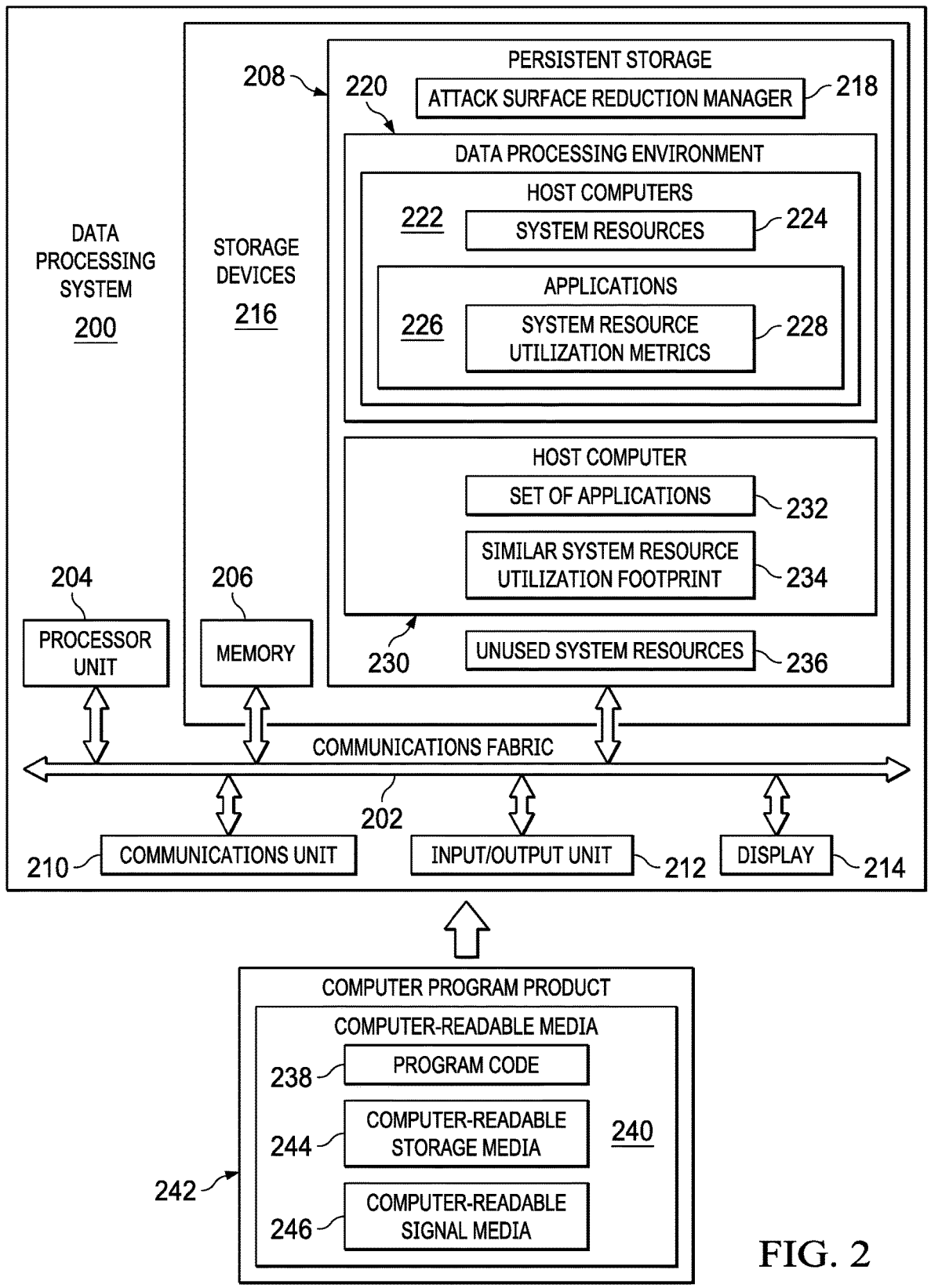
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a server computer, such as server 104 in FIG. 1, in which computer readable program code or instructions implementing processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis or a persistent basis. Further, a computer readable storage device excludes a propagation medium. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores attack surface reduction manager 218. However, it should be noted that even though attack surface reduction manager 218 is illustrated as residing in persistent storage 208, in an alternative illustrative embodiment attack surface reduction manager 218 may be a separate component of data processing system 200. For example, attack surface reduction manager 218 may be a hardware component coupled to communication fabric 202 or a combination of hardware and software components. In another alternative illustrative embodiment, a first set of components of attack surface reduction manager 218 may be located in data processing system 200 and a second set of components of attack surface reduction manager 218 may be located in a second data processing system, such as, for example, server 106 in FIG. 1.

Attack surface reduction manager 218 controls the process of reducing attack surfaces on host computers 222 in data processing environment 220 by selectively collocating applications having a similar system resource utilization footprint on a same host computer and removing any unused system resources corresponding to host computers 222. Host computers 222 represent identifiers for a plurality of host computers included in data processing environment 220 and may be, for example, host computers 110, 112, and 114 in FIG. 1. Data processing environment 220 represents an identifier of a particular data processing environment, such as, for example, data processing environment 110 in FIG. 1.

Host computers 222 include system resources 224 and applications 226. System resources include host computer resources and network resources that provide a runtime environment for applications 226. Applications 226 represent running resident applications on host computers 222. Applications 226 may also represent any type of applications, such as, for example, banking applications, financial applications, educational application, governmental applications, healthcare applications, organizational applications, enterprise applications, and the like, which may be hosted by host computers 222.

System resource utilization metrics 228 correspond to each respective application in applications 226. System resource utilization metrics 228 represent information and measurements regarding the type and amount of system resources utilized by a particular application. Attack surface reduction manager 218 obtains system resource utilization metrics 228 from software agents located on each of host computers 222. Attack surface reduction manager 218 utilizes system resource utilization metrics 228 to determine a system resource utilization footprint of each respective application in applications 226.

Attack surface reduction manager 218 collocates set of applications 232 having similar system resource utilization footprint 234 on host computer 230. Collocating is the act of placing or arranging applications together on a same host computer. Set of applications 232 represent a particular group of applications in applications 226 that have a same or similar resource utilization metric pattern, characteristic, or behavior (i.e., footprint). Attack surface reduction manager 218 may utilize, for example, a defined range of resource utilization metric similarity to determine whether each application in set of applications 232 has comparable resource utilization metrics to be collocated together on a same host computer, such as host computer 230. In other words, each application in applications 232 needs to have similar, comparable, or like resource utilization metrics within the defined range of resource utilization metric similarity to be included in set of applications 232. Thus, attack surface reduction manager 218 will not include an application having resource utilization metrics outside the defined range of resource utilization metric similarity within set of applications 232. Host computer 230 represents a specified host computer in host computers 222 that attack surface reduction manager 218 assigns set of applications 232 to for hosting based on that particular host computer having a greatest determined attack surface reduction (i.e., greatest number of unused system resources removed) after placing set of applications 232 on host computer 230.

Attack surface reduction manager 218 also collocates other different sets of applications having similar system resource utilization footprints on other host computers in host computers 222 based on those host computers having greatest determined attack surface reductions as well. After collocating all the different sets of applications having similar system resource footprints on the different host computers, attack surface reduction manager 218 removes unused system resources 236 from each of the host computers in host computers 222 to achieve data processing environment 220-wide attack surface reduction to increase security of data processing environment 220.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246.

In these illustrative examples, computer readable storage media 244 is a physical or tangible storage device used to store program code 238 rather than a medium that propagates or transmits program code 238. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 240" can be singular or plural. For example, program code 238 can be located in computer readable media 240 in the form of a single storage device or system. In another example, program code 238 can be located in computer readable media 240 that is distributed in multiple data processing systems. In other words, some instructions in program code 238 can be located in one data processing system while other instructions in program code 238 can be located in one or more other data processing systems. For example, a portion of program code 238 can be located in computer readable media 240 in a server computer while another portion of program code 238 can be located in computer readable media 240 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 238.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
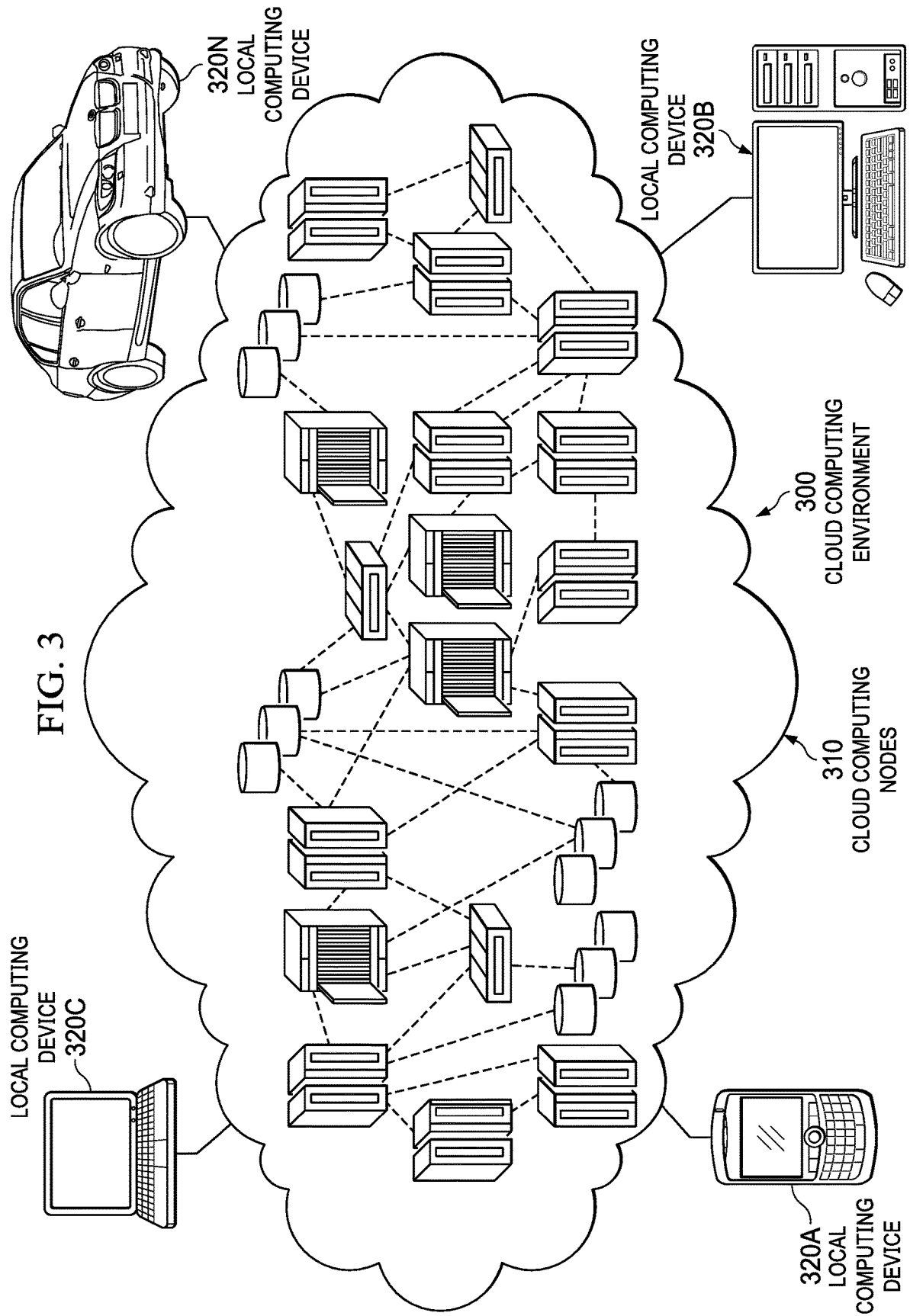
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, host computers 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
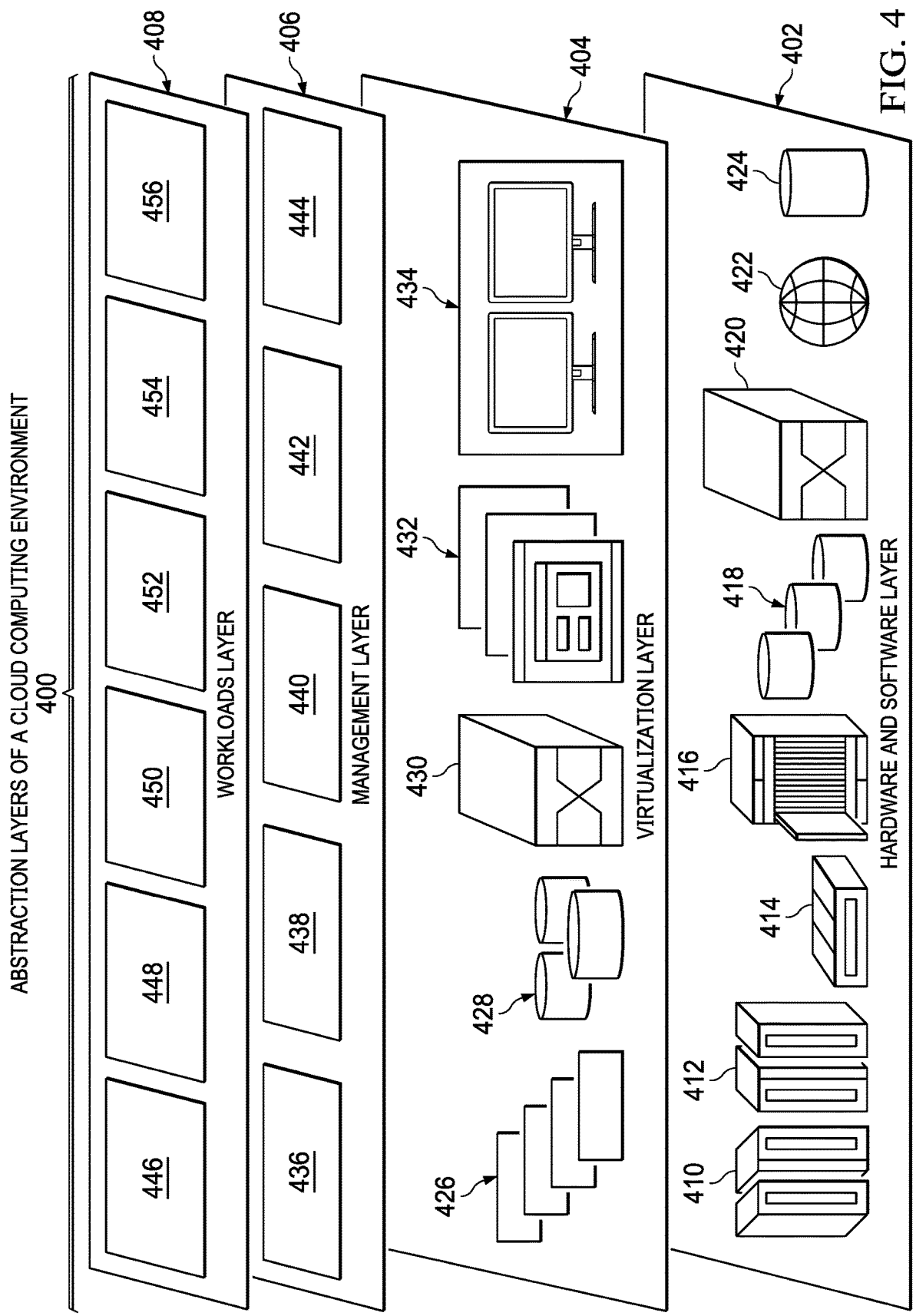
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and attack surface reduction management 456.

Illustrative embodiments decrease an attacker's ability to access network resources by reducing the number of available system resources corresponding to each host computer in a cluster or cloud environment. Illustrative embodiments decrease the overall attack surface on each host computer by measuring the application system resource utilization footprint on each host computer. For example, for each application across a cluster of host computers, illustrative embodiments measure host computer and network resource utilization footprint of each respective application in the cluster of host computers. Illustrative embodiments then identify, group, and collocate those applications having similar system resource footprints on a same host computer in the cluster. In other words, each host computer in the cluster hosts a different set of applications having similar system resource utilization metrics. On all host computers in the cluster, illustrative embodiments excise or remove all unused resources to achieve cluster-wide attack surface reduction. System resources may include, for example, shared network services, shared network traffic destinations (e.g., internet protocol addresses, port numbers, and the like), shared libraries, shared system stacks, shared kernel system calls, shared kernel subsystems, shared network resources, shared sensitive user accounts or groups with elevated access privileges, shared sensitive applications with elevated access privileges, and the like.

Collocation of applications allows illustrative embodiments to load a host computer with only those applications that have same or similar system resource utilization metrics (i.e., footprint), thus, allowing illustrative embodiments to remove unused system resources on a host computer and decrease the attack surface of that host computer. Illustrative embodiments measure application system resource utilization metric patterns, characteristics, and behaviors across all host computers in an entire cluster or cloud environment to make application collocation decisions that will improve the overall security of the cluster or cloud environment based on the obtained attack surface metrics. Illustrative embodiments may utilize a defined range of system resource utilization metrics to determine similarity. In other words, illustrative embodiments perform host computer attack surface area reduction by collocating applications with same or similar system resource utilization metrics (i.e., same or similar utilization of host computer resources and network resources within the defined range of resource utilization metric similarity) and removing unused system resources corresponding to the host computers based on attack surface similarities. Thus, illustrative embodiments utilize scheduling and placement of applications on different host computers to decrease the amount of attack surface on each host computer in the cluster or cloud environment.

As a result, illustrative embodiments increase overall security and trust of a cluster or cloud environment via application collocation that is based on application attack surface measurements, which reduces the likelihood of a successful attack. Further, illustrative embodiments decrease susceptibility of the cluster or cloud environment from being accessed by a malicious actor.

Thus, illustrative embodiments provide one or more technical solutions that overcome a technical problem with delivering environment-wide security (i.e., reducing cluster-wide or cloud-wide attack surface on host computers). As a result, these one or more technical solutions provide a technical effect and practical application in the field of network and systems security.

Figure 5:
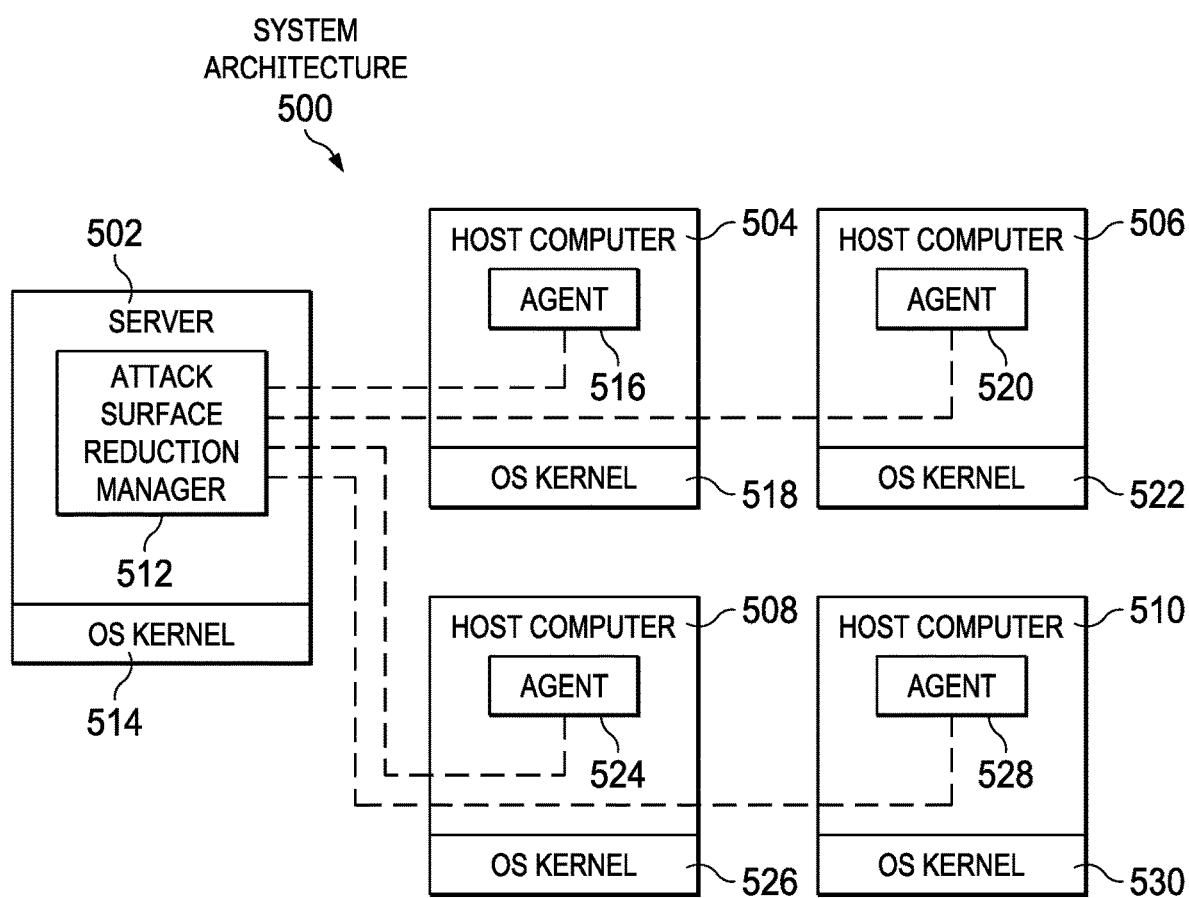
FIG. 5 is a diagram illustrating an example of a system architecture in accordance with an illustrative embodiment.

With reference now to FIG. 5, a diagram illustrating an example of a system architecture system is depicted in accordance with an illustrative embodiment. System architecture 500 may be implemented in a data processing environment, such as data processing environment 100 in FIG. 1, or a cloud computing environment, such as cloud computing environment 300 in FIG. 3. System architecture 500 is a system of hardware and software components for reducing an attack surface on host computers by selectively collocating a set of applications having a similar system resource utilization footprint on a same host computer and removing unused system resources from the host computers.

In this example, system architecture 500 includes server 502, host computer 504, host computer 506, host computer 508, and host computer 510. However, it should be noted that system architecture 500 is intended as an example only and not as a limitation on illustrative embodiments. In other words, system architecture 500 may include any number of servers, host computers, and other devices and components not shown.

Server 502 may be, for example, server 104 in FIG. 1, data processing system 200 in FIG. 2, or a cloud computing node in cloud computing nodes 310 in FIG. 3. Host computers 504, 506, 508, and 510 may be, for example, host computers 110-114 in FIG. 1 or local computing devices 320A-320N in FIG. 3.

In this example, server 502 includes attack surface reduction manager 512, which runs on operating system kernel 514. Host computer 504 includes agent 516, which runs on operating system kernel 518. Host computer 506 includes agent 520, which runs on operating system kernel 522. Host computer 508 includes agent 524, which runs on operating system kernel 526. Host computer 510 includes agent 528, which runs on operating system kernel 530.

Server 502 utilizes attack surface reduction manager 512 to obtain host computer and application metrics from agents 516, 520, 524, and 528 located on host computers 504, 506, 508, and 510, respectively. Attack surface reduction manager 512 utilizes the host computer and application metric information obtained from agents 516, 520, 524, and 528 to make application collocation and host computer attack surface reduction (i.e., unused system resource removal) decisions for host computers 504, 506, 508, and 510. An agent in a respective host computer is responsible for monitoring and collecting the host computer and application metrics of its host computer. However, it should be noted that a respective agent may also handle application migration and attack surface reduction on its corresponding host computer based on instructions received from attack surface reduction manager 512.

Attack surface reduction manager 512 performs application collocation to decrease the attack surface on each of host computers 504, 506, 508, and 510. Collocation is the act of placing or arranging a particular set of applications together in one particular host computer. The attack surface corresponding to a host computer is the sum of the different points (e.g., "attack vectors") where an unauthorized user (i.e., an "attacker") can try to gain access to resources, such as, for example, applications, data, and the like, located on or controlled by the host computer. Examples of attack vectors may include, for example, user input fields, protocols, application programming interfaces, and services.

Attack surface reduction manager 512 may utilize a greedy collocation algorithm, such as, for example:
A is a plurality of applications to assign to a plurality of host computers H in a cluster or cloud environment;
for each host computer h in plurality of host computers H:
l=number of available application slots in a host computer h,
C=sets of application combinations in plurality of applications A with length l;
for each set of applications c in sets of application combinations C:
if set of resources used by set of applications (c) $R_c \subseteq$ resources of a host computer (h), then set of unused resources $S_c$=resources(h)−$R_c$;
Assign set of applications c to host computer h where set of unused resources $S_c$ of host computer h is largest.

Globally maximize:
perform above computation on all permutations of the plurality of host computers H;
select application collocation assignments where the sum of all sets of unused resources $S_c$ in the plurality of host computers H is greatest.

Global maximization looks at maximizing the reduction of unused resources across all host computers in the cluster or cloud environment. Thus, this global maximization algorithm shows how illustrative embodiments can identify and analyze all possible application and host computer combinations to find the one application collocation configuration that will be optimal globally.

During boot strap of a new cluster or cloud environment (i.e., host computers 504, 506, 508, and 510), attack surface reduction manager 512 deploys applications to host computers 504, 506, 508, and 510. Attack surface reduction manager 512 then profiles the applications to obtain the system resource utilization footprint of each respective application running in host computers 504, 506, 508, and 510. Attack surface reduction manager 512 then identifies and groups each set of applications running in the new cluster or cloud environment with similar system resource utilization footprints. Afterward, attack surface reduction manager 512 collocates a set of applications having a similar system resource utilization footprint on a same host computer, such as, for example, host computer 504. Similarly, attack surface reduction manager 512 collocates other sets of applications having similar system resource utilization footprints on other host computers, such as, for example, host computers 506, 508, and 510. An example of application migration may include attack surface reduction manager 512 utilizing existing techniques for migrating applications, virtual machines, containers, or the like.

Then, attack surface reduction manager 512 reduces the attack surface corresponding to each of host computers 504, 506, 508, and 510 by decreasing the number of unused system resources, such as, for example, shared libraries and kernel system calls, on each respective host computer. Other examples of host computer attack surface reduction may include: attack surface reduction manager 512 removing user-level libraries not in use; attack surface reduction manager 512 downloading a new reduced attack surface operating system or operating system kernel and initiating a host computer reboot to exchange the current version of the operating system or operating system kernel with the new version or performing a transparent operating system or operating system kernel update; attack surface reduction manager 512 updating firewall rules to restrict network services or activities to certain internet protocol addresses and port numbers; and the like.

During cluster or cloud environment runtime, attack surface reduction manager 512 initially places a new application in server 502. Then, attack surface reduction manager 512 profiles the new application to obtain the new application's system resource utilization footprint. Further, attack surface reduction manager 512 obtains system resource utilization patterns, characteristics, or behaviors of applications running on all of host computers 504, 506, 508, and 510. Furthermore, attack surface reduction manager 512 selects a best matching host computer (e.g., host computer 506) to place the new application based on obtained system resource utilization patterns of applications running on the selected host computer that match the new application's system resource utilization pattern. Then, attack surface reduction manager 512 places the new application on the selected host computer having applications with similar system resource utilization footprints.

Figure 6:
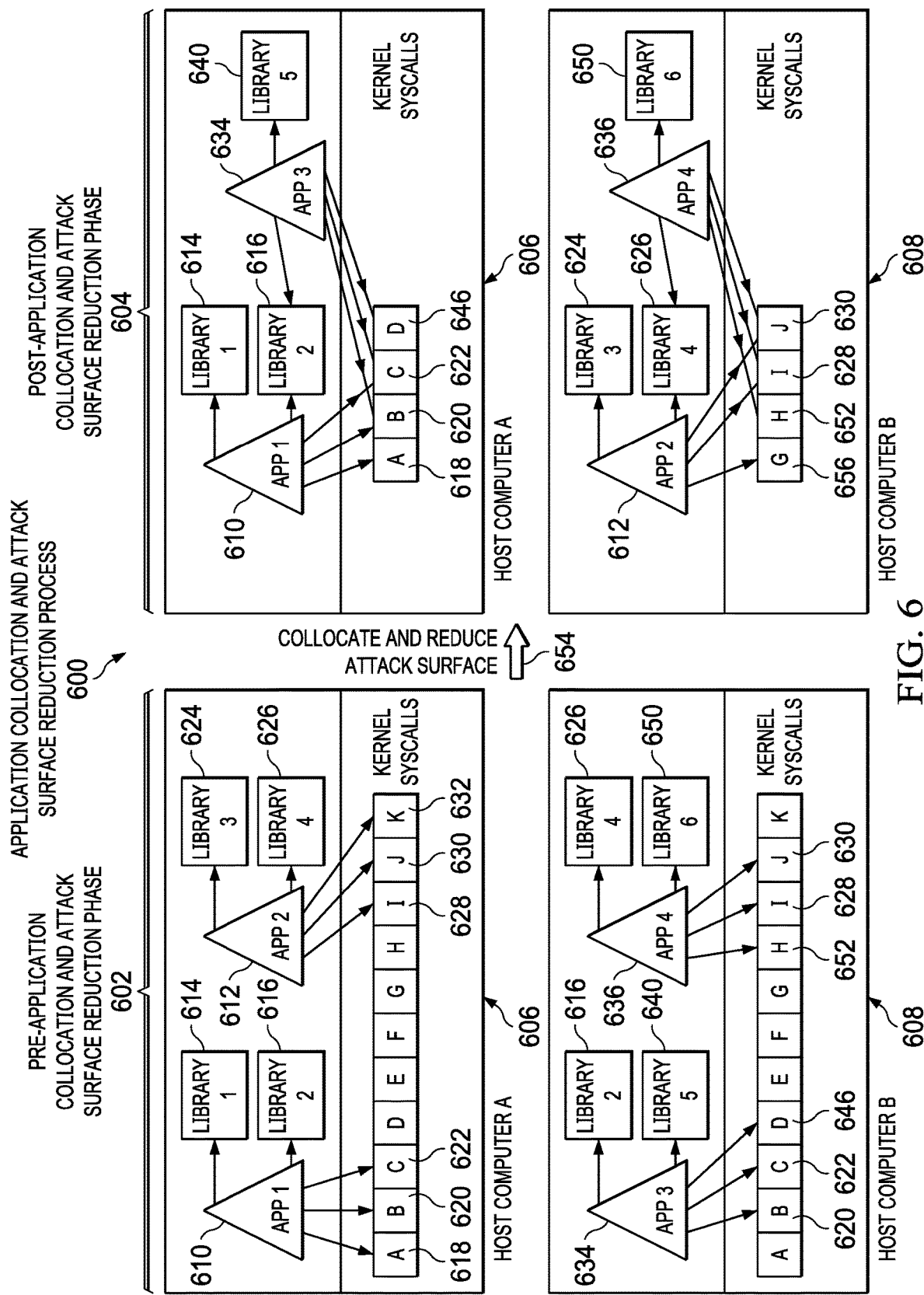
FIG. 6 is a diagram illustrating an example of an application collocation and attack surface reduction process in accordance with an illustrative embodiment.

With reference now to FIG. 6, a diagram illustrating an example of an application collocation and attack surface reduction process is depicted in accordance with an illustrative embodiment. Application collocation and attack surface reduction process 600 may be implemented in system architecture 500 and controlled by attack surface reduction manager 512 in FIG. 5.

Application collocation and attack surface reduction process 600 includes pre-application collocation and attack surface reduction phase 602 and post-application collocation and attack surface reduction phase 604. In this example, pre-application collocation and attack surface reduction phase 602 and post-application collocation and attack surface reduction phase 604 include host computer A 606 and host computer B 608. However, it should be noted that application collocation and attack surface reduction process 600 is intended as an example only and not as a limitation on illustrative embodiments. In other words, application collocation and attack surface reduction process 600 may include any number of host computers.

In pre-application collocation and attack surface reduction phase 602, host computer A 606 and host computer B 608 are in a pre-application collocation and attack surface reduction state. For example, host computer A 606 includes application 1 610 and application 2 612. Application 1 610 utilizes library 1 614 and library 2 616. In addition, application 1 610 utilizes kernel system call A 618, kernel system call B 620, and kernel system call C 622 of kernel system calls A-K. Application 2 612 utilizes library 3 624 and library 4 626. Application 2 612 also utilizes kernel system call I 628, kernel system call J 630, and kernel system call K 632 of kernel system calls A-K. Similarly, host computer B 608 includes application 3 634 and application 4 636. Application 3 634 utilizes library 2 616 and library 5 640. In addition, application 3 634 utilizes kernel system call B 620, kernel system call C 622, and kernel system call D 646 of kernel system calls A-K. Application 4 636 utilizes library 4 626 and library 6 650. Application 4 636 is also utilizing kernel system call H 652, kernel system call I 628, and kernel system call J 630 of kernel system calls A-K.

It should be noted that in pre-application collocation and attack surface reduction phase 602, application 1 610 and application 3 634 have similar system resource utilization. For example, both application 1 610 and application 3 634 utilize library 2 616, along with kernel system call B 620 and kernel system call C 622. Similarly, application 2 612 and application 4 636 have similar system resource utilization. For example, both application 2 612 and application 4 636 utilize library 4 626, along with kernel system call I 628 and kernel system call J 630.

At 654, the attack surface reduction manager collocates applications and reduces attack surface on host computer A 606 and host computer B 608. As a result, in post-application collocation and attack surface reduction phase 604, host computer A 606 includes application 1 610 and application 3 634 and host computer B 608 includes application 2 612 and application 4 636 based on similar application system resource utilization patterns. For example, application 1 610 continues to utilize library 1 614 and library 2 616 in host computer A 606, same as in pre-application collocation and attack surface reduction phase 602, but now application 3 634 shares library 2 616 with application 1 610 and utilizes library 5 640, which the attack surface reduction manager migrated from host computer B 608 to host computer A 606 along with application 3 634. Also, it should be noted that the attack surface reduction manager removed library 3 624 and library 4 626 (i.e., unused system resources) from host computer A 606 to reduce the attack surface on host computer A 606 and migrated library 3 624 and library 4 626 to host computer B 608. Further, application 1 610 continues to utilize kernel system call A 618, kernel system call B 620, and kernel system call C 622, same as in pre-application collocation and attack surface reduction phase 602, but now application 3 634 shares kernel system call B 620 and kernel system call C 622 with application 1 610 and also utilizes kernel system call D 646. In addition, it should be noted that the attack surface reduction manager removed kernel system calls E-K (i.e., unused system resources) to further reduce the attack surface on host computer A 606.

Also in post-application collocation and attack surface reduction phase 604, application 2 612 continues to utilize library 3 624 and library 4 626, which the attack surface reduction manager migrated from host computer A 606 to host computer B 608 along with application 2 612, and now application 4 636 shares library 4 626 with application 2 612 and utilizes library 6 650. Also, it should be noted that the attack surface reduction manager removed library 2 616 and library 5 640 (i.e., unused system resources) from host computer B 608 to reduce the attack surface on host computer B 608 and migrated library 5 640 to host computer A 606. Further, application 4 636 continues to utilize kernel system call H 652, kernel system call I 628, and kernel system call J 630, same as in pre-application collocation and attack surface reduction phase 602, but now application 2 612 shares kernel system call I 628 and kernel system call J 630 with application 4 636 and also utilizes kernel system call G 656. In addition, it should be noted that the attack surface reduction manager removed kernel system calls A-F and K (i.e., unused system resources) to further reduce the attack surface on host computer B 608.

Figure 7:
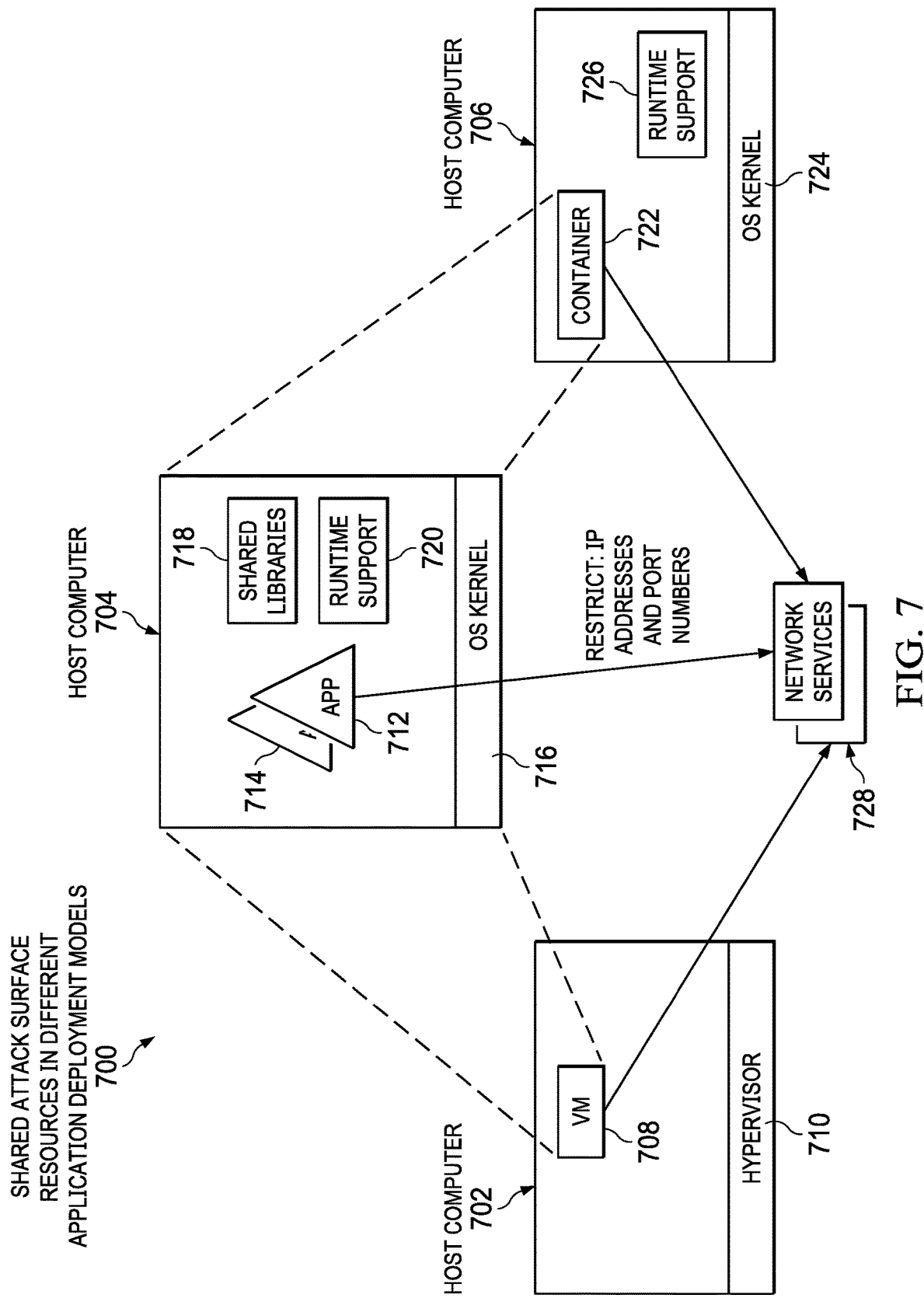
FIG. 7 is a diagram illustrating an example of shared attack surface resource in different application deployment models in accordance with an illustrative embodiment.

With reference now to FIG. 7, a diagram illustrating an example of shared attack surface resource in different application deployment models is depicted in accordance with an illustrative embodiment. In this example, shared attack surface resource in different application deployment models 700 include host computer 702, host computer 704, and host computer 706. However, it should be noted that shared attack surface resource in different application deployment models 700 may include any number of host computers having any type of application deployment model.

Host computer 702 includes virtual machine 708, which runs on hypervisor 710. Hypervisor 710 is the shared attack surface resource in this model. An attack surface reduction manager, such as, for example, attack surface reduction manager 512 in FIG. 5, may recompile hypervisor 710 to reduce the attack surface of hypervisor 710.

Host computer 704 includes application 712 and application 714, which run on operating system kernel 716 and utilize shared libraries 718 and runtime support 720. Operating system kernel 716, shared libraries 718, and runtime support 720 are the shared attack surface resources in this model. The attack surface reduction manager may download and install an update to operating system kernel 716, which decreases the attack surface of operating system kernel 716. Further, the attack surface reduction manager may remove unused libraries in shared libraries 718 and unused runtime support, such as, for example, unused kernel system calls, in runtime support 720 to further reduce the attack surface in host computer 704.

Host computer 706 includes container 722, which run on operating system kernel 724 and utilize runtime support 726. Operating system kernel 724 and runtime support 726 are the shared attack surface resources in this model. The attack surface reduction manager may reboot and install a new version of operating system kernel 724, which has a decreased attack surface. In addition, the attack surface reduction manager may remove unused runtime support in runtime support 726 to further reduce the attack surface in host computer 704.

Network services 728 are also shared attack surface resources corresponding to host computer 702, host computer 704, and host computer 706. The attack surface reduction manager may update firewall rules to restrict network traffic to certain internet protocol addresses and port numbers only. The attack surface reduction manager may also remove unused internet protocol addresses and port numbers to reduce attack surface.

Figure 8:
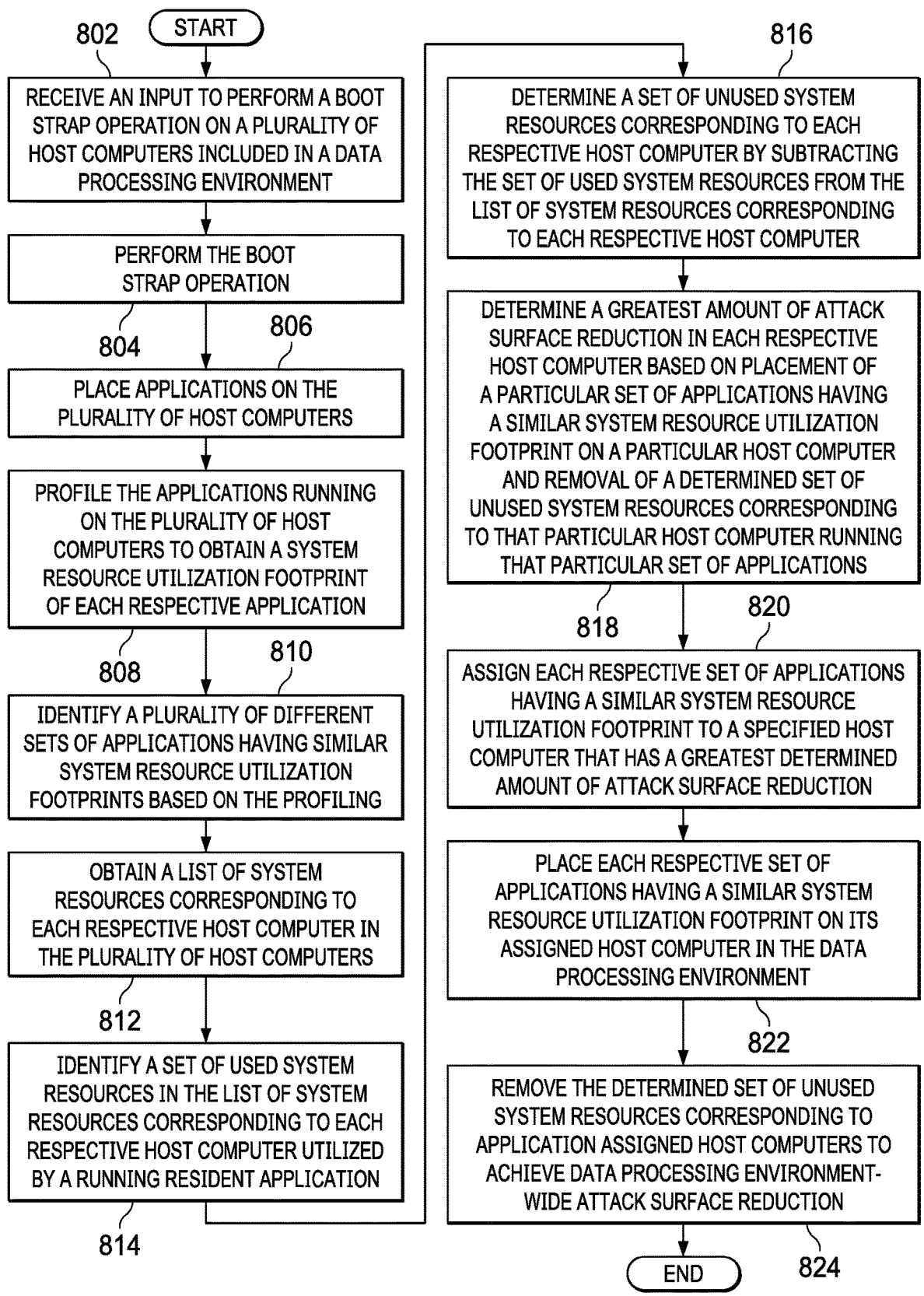
FIG. 8 is a flowchart illustrating a process for application placement during system boot strap in accordance with an illustrative embodiment.

With reference now to FIG. 8, a flowchart illustrating a process for application placement during system boot strap is shown in accordance with an illustrative embodiment. The process shown in FIG. 8 may be implemented in a server computer, such as, for example, server 104 in FIG. 1, or data processing system 200 in FIG. 2, a cloud computing node in cloud computing nodes 310 of cloud computing environment 300 in FIG. 3, or server 502 in FIG. 5.

The process begins when the server computer receives an input to perform a boot strap operation on a plurality of host computers included in a data processing environment (step 802). The data processing environment may be, for example, a cluster of host computers or a cloud environment comprised of the plurality of host computers. In response to receiving the input to perform the boot strap operation in step 802, the server performs the boot strap operation on the plurality of host computers (step 804).

The server places applications on the plurality of host computers (step 806). The server profiles the applications running on the plurality of host computers to obtain a system resource utilization footprint of each respective application (step 808). The server may obtain the application profile information from a software agent located on each respective host computer. A system resource utilization footprint identifies a pattern (i.e., type and amount) of system resource usage by a particular application running on a host computer.

The server identifies a plurality of different sets of applications having similar system resource utilization footprints based on the profiling of the applications (step 810). In addition, the server obtains a list of system resources corresponding to each respective host computer in the plurality of host computers (step 812). The server may also obtain the list of system resources of each respective host computer from the software agent.

The server identifies a set of used system resources in the list of system resources corresponding to each respective host computer being utilized by a running resident application (step 814). Further, the server determines a set of unused system resources corresponding to each respective host computer by subtracting the set of used system resources from the list of system resources corresponding to each respective host computer (step 816).

The server determines a greatest amount of attack surface reduction in each respective host computer based on placement of a particular set of applications having a similar system resource utilization footprint on a particular host computer and removal of a determined set of unused system resources corresponding to that particular host computer running that particular set of applications (step 818). The server assigns each respective set of applications having a similar system resource utilization footprint to a specified host computer that has a greatest determined amount of attack surface reduction (step 820).

The server places each respective set of applications having a similar system resource utilization footprint on its assigned host computer in the data processing environment (step 822). Furthermore, the server removes the determined set of unused system resources corresponding to application assigned host computers to achieve data processing environment-wide attack surface reduction (step 824). Thereafter, the process terminates.

Figure 9:
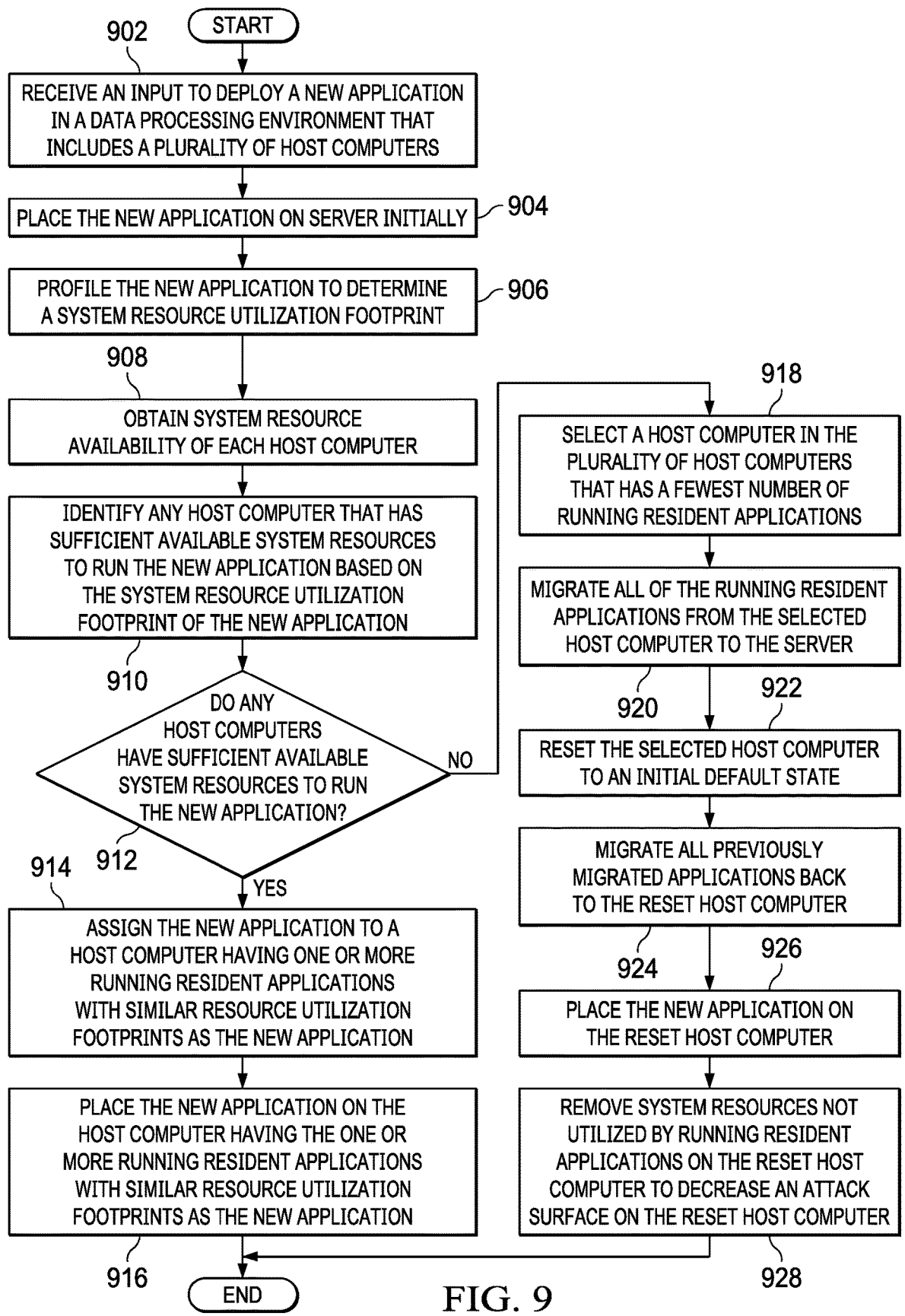
FIG. 9 is a flowchart illustrating a process for application placement during system runtime in accordance with an illustrative embodiment.

With reference now to FIG. 9, a flowchart illustrating a process for application placement during system runtime is shown in accordance with an illustrative embodiment. The process shown in FIG. 9 may be implemented in a server computer, such as, for example, server 104 in FIG. 1, or data processing system 200 in FIG. 2, a cloud computing node in cloud computing nodes 310 of cloud computing environment 300 in FIG. 3, or server 502 in FIG. 5.

The process begins when the server computer receives an input to deploy a new application in a data processing environment that includes a plurality of host computers (step 902). In response to receiving the input to deploy the new application in step 902, the server places the new application on the server initially (step 904). In addition, the server profiles the new application to determine a system resource utilization footprint of the new application (step 906).

Further, the server obtains system resource availability of each host computer in the data processing environment (step 908). Furthermore, the server identifies any host computer that has sufficient available system resources to run the new application based on the system resource utilization footprint of the new application (step 910). Afterward, the server makes a determination as to whether any host computers have sufficient available system resources to run the new application (step 912).

If the server determines that a set of host computers in the plurality of host computers has sufficient available system resources to run the new application, yes output of step 912, then the server assigns the new application to a host computer in the set having one or more running resident applications with similar resource utilization footprints as the new application (step 914). The server places the new application on the host computer having the one or more running resident applications with similar resource utilization footprints as the new application (step 916). Thereafter, the process terminates.

Returning again to step 912, if the server determines that no host computer in the plurality of host computers has sufficient available system resources to run the new application, no output of step 912, then the server selects a host computer in the plurality of host computers that has a fewest number of running resident applications (step 918). The server migrates all of the running resident applications from the selected host computer to the server temporarily (step 920). The server resets the selected host computer to an initial default state to form a reset host computer (step 922).

Subsequently, the server migrates all previously migrated applications from the selected host computer back to the reset host computer from the server (step 924). The server then places the new application on the reset host computer (step 926). Moreover, the server removes system resources not utilized by running resident applications on the reset host computer to decrease an attack surface on the reset host computer (step 928). Thereafter, the process terminates.

Figure 10:
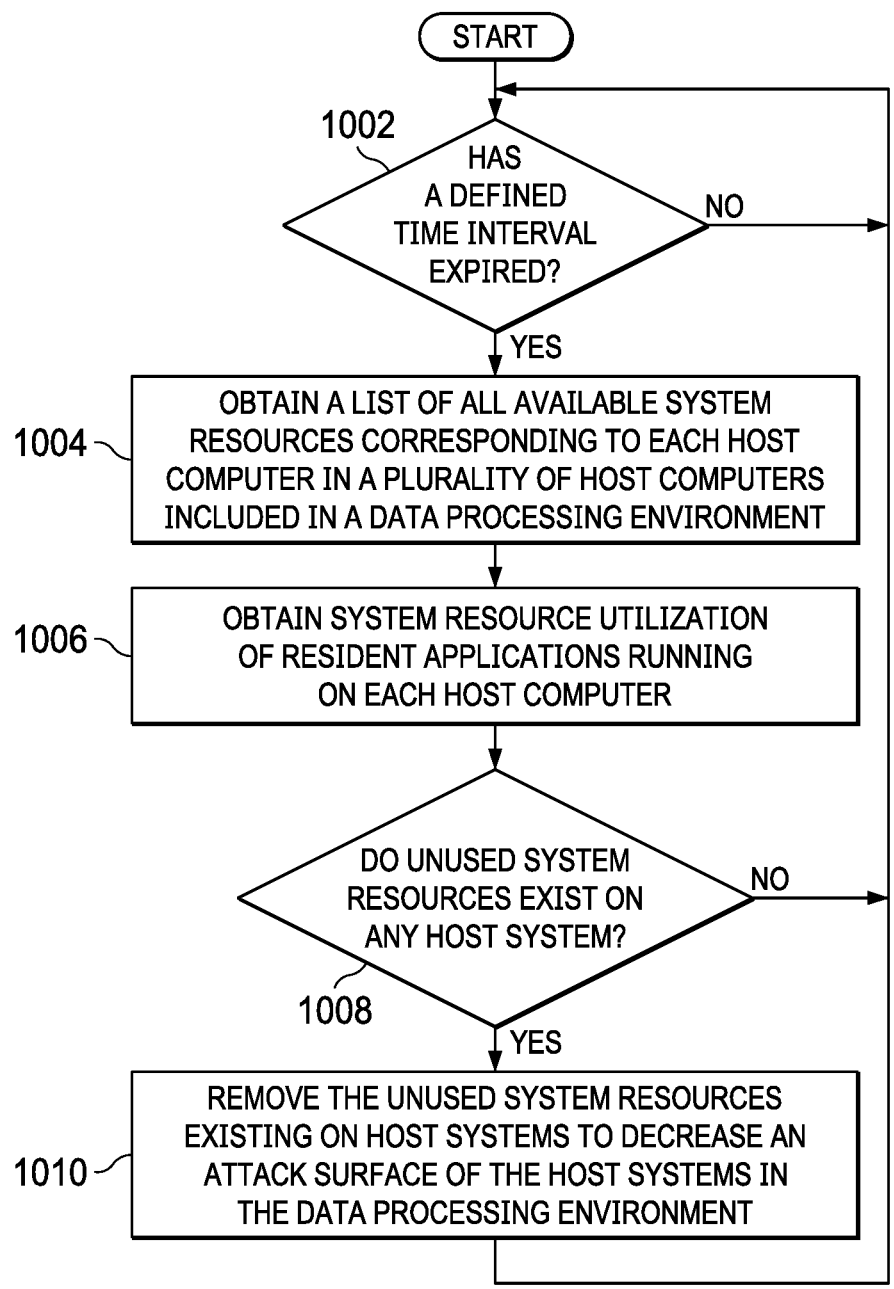
FIG. 10 is a flowchart illustrating a process for host computer attack surface reduction during runtime in accordance with an illustrative embodiment.

With reference now to FIG. 10, a flowchart illustrating a process for host computer attack surface reduction during runtime is shown in accordance with an illustrative embodiment. The process shown in FIG. 10 may be implemented in a server computer, such as, for example, server 104 in FIG. 1, or data processing system 200 in FIG. 2, a cloud computing node in cloud computing nodes 310 of cloud computing environment 300 in FIG. 3, or server 502 in FIG. 5.

The process begins when the server makes a determination as to whether a defined time interval has expired (step 1002). If the server determines that the defined time interval has not expired, no output of step 1002, then the process returns to step 1002 where the server continues to wait for the defined time interval to expire. If the server determines that the defined time interval has expired, yes output of step 1002, then the server obtains a list of all available system resources corresponding to each host computer in a plurality of host computers included in a data processing environment monitored by the server (step 1004). In addition, the server obtains system resource utilization of resident applications running on each host computer in the plurality of host computers (step 1006). The server may obtain the lists of available system resources and system resource utilization information from a software agent located in each respective host computer.

The server makes a determination as to whether unused system resources exist on any host system based on the list of available system resources corresponding to each respective host computer and the system resource utilization of the resident applications running on each respective host computer (step 1008). If server determines that no unused system resources exist on any host system based on the list of available system resources corresponding to each respective host computer and the system resource utilization of the resident applications running on each respective host computer, no output of step 1008, then the process returns to step 1002 where the server waits for the next time interval to expire. If server determines that unused system resources do exist on one or more host systems based on the list of available system resources corresponding to each respective host computer and the system resource utilization of the resident applications running on each respective host computer, yes output of step 1008, then the server removes the unused system resources existing on the one or more host systems to decrease an attack surface of those host systems in the data processing environment (step 1010). Thereafter, the process returns to step 1002 where the server waits for the next time interval to expire.

Figure 11:
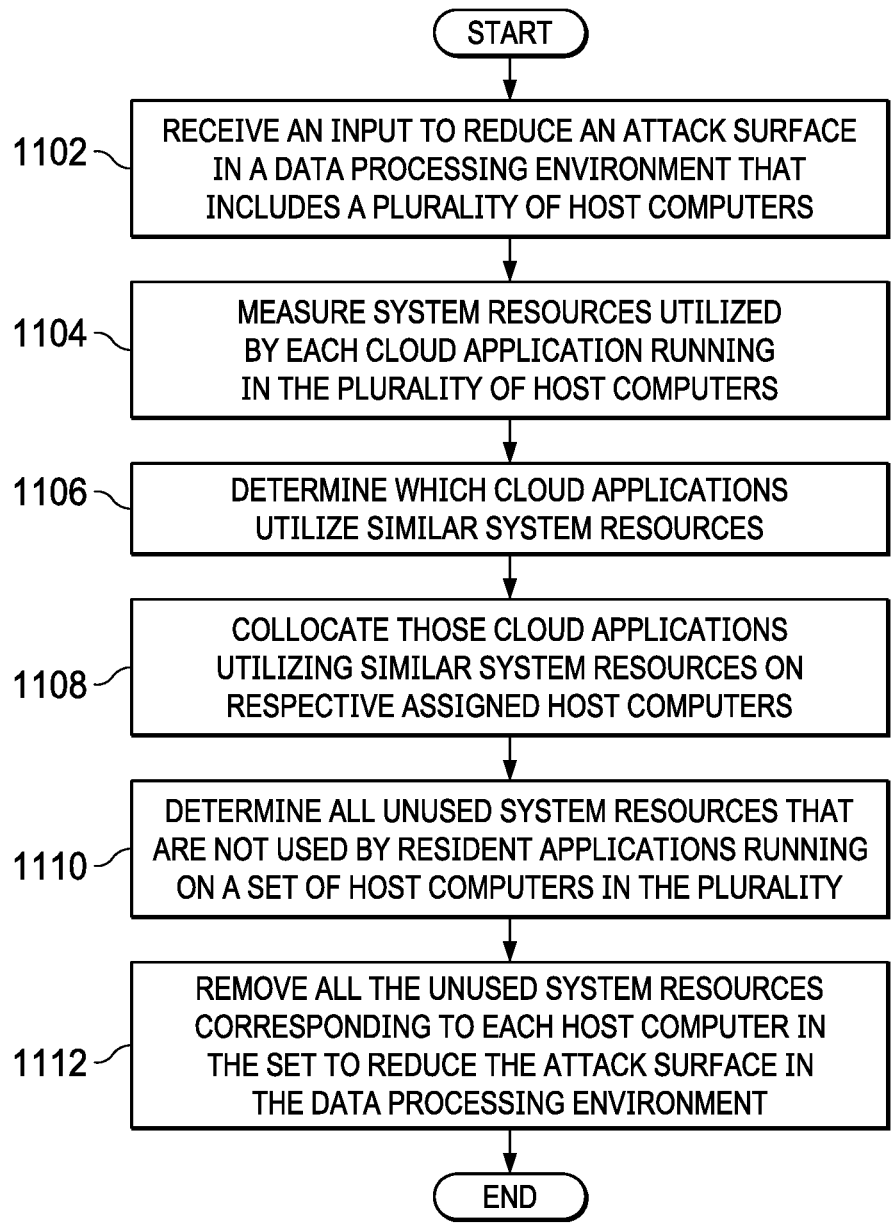
FIG. 11 is a flowchart illustrating a process for reducing attack surface by selectively collocating applications on host computers in accordance with an illustrative embodiment.

With reference now to FIG. 11, a flowchart illustrating a process for reducing attack surface by selectively collocating applications on host computers is shown in accordance with an illustrative embodiment. The process shown in FIG. 11 may be implemented in a server computer, such as, for example, server 104 in FIG. 1, or data processing system 200 in FIG. 2, a cloud computing node in cloud computing nodes 310 of cloud computing environment 300 in FIG. 3, or server 502 in FIG. 5.

The process begins when the server computer receives an input to reduce an attack surface in a data processing environment that includes a plurality of host computers (step 1102). In this example, the data processing environment is a cloud environment. In response to receiving the input to reduce the attack surface in the data processing environment in step 1102, the server measures system resources utilized by each cloud application running in the plurality of host computers (step 1104). The server determines which cloud applications running in the plurality of host computers utilize similar system resources (step 1106).

The server collocates those cloud applications utilizing similar system resources on respective assigned host computers (step 1108). The server determines all unused system resources that are not used by resident applications running on a set of host computers in the plurality of host computers (step 1110). The server removes all the unused system resources corresponding to each host computer in the set of host computers to reduce the attack surface in the data processing environment (step 1112). Thereafter, the process terminates.

Thus, illustrative embodiments of the present invention provide a computer-implemented method, computer system, and computer program product for reducing an attack surface on host computers by selectively collocating a set of applications having a similar system resource utilization footprint on a same host computer and removing unused system resources from the host computers. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for reducing attack surface by selectively collocating applications on host computers, the method comprising:
   measuring system resources utilized by each application running in a plurality of host computers of a data processing environment;
   determining which applications running in the plurality of host computers utilize similar system resources; and
   collocating those applications utilizing similar system resources on respective host computers, wherein the collocating comprises:
      determining a greatest amount of attack surface reduction in each respective host computer based on placement of a particular set of applications having a similar system resource utilization footprint on a particular host computer and removal of a determined set of unused system resources corresponding to that particular host computer running that particular set of applications;
      assigning each respective set of applications having the similar system resource utilization footprint to a specified host computer that has the greatest determined amount of attack surface reduction; and
      placing each respective set of applications having the similar system resource utilization footprint on its assigned host computer in the data processing environment.

2. The method of claim 1 further comprising:
   determining unused system resources not used by resident applications running on a set of host computers in the plurality of host computers; and
   removing the unused system resources corresponding to each respective host computer in the set of host computers to reduce the attack surface in the data processing environment, wherein the determining the unused system resources not used by the resident applications comprises:
      obtaining a list of system resources corresponding to each respective host computer in the plurality of host computers;
      identifying a set of used system resources in the list of system resources corresponding to each respective host computer being utilized by a running resident application; and
      determining a set of unused system resources corresponding to each respective host computer by subtracting the set of used system resources from the list of system resources corresponding to each respective host computer.

3. The method of claim 1 further comprising:
   performing a boot strap operation on the plurality of host computers in the data processing environment;
   profiling the applications running on the plurality of host computers to obtain a system resource utilization footprint of each respective application, wherein a system resource utilization footprint identifies a pattern of system resource usage by a particular application running on a host computer; and
   identifying a plurality of different sets of applications having similar system resource utilization footprints based on the profiling of the applications.

4. The method of claim 1 wherein the collocating comprises placing the those applications utilizing similar system resources together on a same host computer.

5. The method of claim 1 further comprising:
   placing a new application on a server;
   profiling the new application to determine a system resource utilization footprint of the new application;
   obtaining system resource availability of each respective host computer in the plurality of host computers;
   identifying any host computer that has available system resources to run the new application based on the system resource utilization footprint of the new application; and
   determining whether any host computers have available system resources to run the new application.

6. The method of claim 5 further comprising:
   responsive to determining that a set of host computers in the plurality of host computers has available system resources to run the new application, assigning the new application to a host computer in the set having one or more running resident applications with similar resource utilization footprints as the new application; and
   placing the new application on the host computer having the one or more running resident applications with similar resource utilization footprints as the new application.

7. The method of claim 5 further comprising:
   responsive to determining that no host computer in the plurality of host computers has available system resources to run the new application, selecting a host computer in the plurality of host computers that has a fewest number of running resident applications;
   migrating resident applications from the selected host computer to the server;
   resetting the selected host computer to an initial default state to form a reset host computer;
   migrating previously migrated applications from the selected host computer back to the reset host computer from the server;
   placing the new application on the reset host computer; and
   removing system resources not utilized by running resident applications on the reset host computer to decrease an attack surface on the reset host computer.

8. The method of claim 1 further comprising:
responsive to determining that a defined time interval expired, obtaining a list of available system resources corresponding to each host computer in a plurality of host computers included in the data processing environment monitored;
obtaining system resource utilization of resident applications running on each host computer in the plurality of host computers;
determining whether unused system resources exist on any host system based on the list of available system resources corresponding to each respective host computer and the system resource utilization of the resident applications running on each respective host computer; and
responsive to determining that unused system resources do exist on one or more host systems, removing the unused system resources existing on the one or more host systems to decrease an attack surface of those host systems in the data processing environment.

9. The method of claim 1, wherein the attack surface is a sum of different points where an unauthorized user can attempt to gain access to computer resources in the plurality of host computers, and further comprising:
identifying and analyzing all possible application and host computer combinations in the plurality of host computers; and
selecting application collocation assignments where a sum of all sets of unused resources in the plurality of host computers is greatest to maximize unused resource reduction across all host computers in the plurality.

10. The method of claim 1, wherein the collocating includes removing applications from a first client host computer and installing the applications on a second client host computer.

11. The method of claim 1, wherein the system resources comprise a runtime environment that include host computer resources and network resources, and wherein the host computer resources and network resources are selected from a group consisting of libraries, kernel system calls, kernel subsystems, hypervisors, network services, internet protocol addresses, port numbers, sensitive network user accounts with elevated access privileges, and sensitive network applications with elevated access privileges.

12. The method of claim 1, wherein the data processing environment is one of a group consisting of a cluster and a cloud environment.

13. A computer system for reducing attack surface by selectively collocating applications on host computers, the computer system comprising:
a bus system;
a storage device connected to the bus system, wherein the storage device stores program instructions; and
a processor connected to the bus system, wherein the processor executes the program instructions to:
measure system resources utilized by each application running in a plurality of host computers of a data processing environment;
determine which applications running in the plurality of host computers utilize similar system resources; and
collocate those applications utilizing similar system resources on respective host computers, wherein the collocate comprises:
determine a greatest amount of attack surface reduction in each respective host computer based on placement of a particular set of applications having a similar system resource utilization footprint on a particular host computer and removal of a determined set of unused system resources corresponding to that particular host computer running that particular set of applications;
assign each respective set of applications having the similar system resource utilization footprint to a specified host computer that has the greatest determined amount of attack surface reduction; and
place each respective set of applications having the similar system resource utilization footprint on its assigned host computer in the data processing environment.

14. The computer system of claim 13, wherein the processor further executes the program instructions to:
determine unused system resources not used by resident applications running on a set of host computers in the plurality of host computers; and
remove the unused system resources corresponding to each respective host computer in the set of host computers to reduce the attack surface in the data processing environment, wherein the determine the unused system resources not used by the resident applications comprises:
obtain a list of system resources corresponding to each respective host computer in the plurality of host computers;
identify a set of used system resources in the list of system resources corresponding to each respective host computer being utilized by a running resident application; and
determine a set of unused system resources corresponding to each respective host computer by subtracting the set of used system resources from the list of system resources corresponding to each respective host computer.

15. The computer system of claim 13, wherein the processor further executes the program instructions to:
perform a boot strap operation on the plurality of host computers in the data processing environment;
profile the applications running on the plurality of host computers to obtain a system resource utilization footprint of each respective application, wherein a system resource utilization footprint identifies a pattern of system resource usage by a particular application running on a host computer; and
identify a plurality of different sets of applications having similar system resource utilization footprints based on the profiling of the applications.

16. The computer system of claim 13, wherein the collocate comprises placing the those applications utilizing similar system resources together on a same host computer.

17. A computer program product for reducing attack surface by selectively collocating applications on host computers, the computer program product comprising a computer readable storage medium having program instructions embodied therewith, the program instructions executable by a computer to cause the computer to perform a method comprising:
measuring system resources utilized by each application running in a plurality of host computers of a data processing environment;
determining which applications running in the plurality of host computers utilize similar system resources; and
collocating those applications utilizing similar system resources on respective host computers, wherein the collocating comprises:

determining a greatest amount of attack surface reduction in each respective host computer based on placement of a particular set of applications having a similar system resource utilization footprint on a particular host computer and removal of a determined set of unused system resources corresponding to that particular host computer running that particular set of applications;

assigning each respective set of applications having the similar system resource utilization footprint to a specified host computer that has the greatest determined amount of attack surface reduction; and placing each respective set of applications having the similar system resource utilization footprint on its assigned host computer in the data processing environment.

18. The computer program product of claim 17 further comprising:

determining unused system resources not used by resident applications running on a set of host computers in the plurality of host computers; and removing the unused system resources corresponding to each respective host computer in the set of host computers to reduce the attack surface in the data processing environment, wherein the determining the unused system resources not used by the resident applications comprises:

obtaining a list of system resources corresponding to each respective host computer in the plurality of host computers;

identifying a set of used system resources in the list of system resources corresponding to each respective host computer being utilized by a running resident application; and determining a set of unused system resources corresponding to each respective host computer by subtracting the set of used system resources from the list of system resources corresponding to each respective host computer.

19. The computer program product of claim 17 further comprising:

performing a boot strap operation on the plurality of host computers in the data processing environment;

profiling the applications running on the plurality of host computers to obtain a system resource utilization footprint of each respective application, wherein a system resource utilization footprint identifies a pattern of system resource usage by a particular application running on a host computer; and identifying a plurality of different sets of applications having similar system resource utilization footprints based on the profiling of the applications.

20. The computer program product of claim 17 wherein the collocating comprises placing the those applications utilizing similar system resources together on a same host computer.

21. The computer program product of claim 17 further comprising:

placing a new application on a server;

profiling the new application to determine a system resource utilization footprint of the new application;

obtaining system resource availability of each respective host computer in the plurality of host computers;

identifying any host computer that has available system resources to run the new application based on the system resource utilization footprint of the new application; and determining whether any host computers have available system resources to run the new application.

22. The computer program product of claim 21 further comprising:

responsive to determining that no host computer in the plurality of host computers has available system resources to run the new application, selecting a host computer in the plurality of host computers that has a fewest number of running resident applications;

migrating resident applications from the selected host computer to the server;

resetting the selected host computer to an initial default state to form a reset host computer;

migrating previously migrated applications from the selected host computer back to the reset host computer from the server;

placing the new application on the reset host computer; and removing system resources not utilized by running resident applications on the reset host computer to decrease an attack surface on the reset host computer.

* * * * *